(12) United States Patent
Schmit

(10) Patent No.: US 11,799,485 B2
(45) Date of Patent: Oct. 24, 2023

(54) TECHNIQUES FOR REDUCING UNEVEN AGING IN INTEGRATED CIRCUITS

(71) Applicant: Intel Corporation, Santa Clara, CA (US)

(72) Inventor: Herman Schmit, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/485,373

(22) Filed: Sep. 25, 2021

(65) Prior Publication Data

US 2022/0014201 A1 Jan. 13, 2022

Related U.S. Application Data

(62) Division of application No. 15/714,361, filed on Sep. 25, 2017, now Pat. No. 11,159,167.

(51) Int. Cl.
| | |
|---|---|
| *G01F 1/10* | (2006.01) |
| *H03K 19/17764* | (2020.01) |
| *H03K 19/17752* | (2020.01) |
| *G06F 30/34* | (2020.01) |
| *H03K 19/17736* | (2020.01) |
| *H03K 19/1776* | (2020.01) |
| *G06F 119/04* | (2020.01) |
| *H03K 3/03* | (2006.01) |

(52) U.S. Cl.
CPC ....... *H03K 19/17764* (2013.01); *G06F 30/34* (2020.01); *H03K 19/1776* (2013.01); *H03K 19/17744* (2013.01); *H03K 19/17752* (2013.01); *G06F 2119/04* (2020.01); *H03K 3/0315* (2013.01); *H03K 19/17736* (2013.01)

(58) Field of Classification Search
CPC ... G06F 30/34; G06F 2119/04; H03K 3/0315; H03K 19/1736; H03K 19/17744; H03K 19/17752; H03K 19/1776; H03K 19/17764
See application file for complete search history.

(56) References Cited

U.S. PATENT DOCUMENTS

| 5,341,339 A | 8/1994 | Wells |
| 6,526,557 B1 | 2/2003 | Young et al. |
| (Continued) | | |

OTHER PUBLICATIONS

European Patent Office, European Search Report and European Search Opinion for European Patent Application EP EP 18 19 0097.8.

*Primary Examiner* — Kurtis R Bahr
(74) *Attorney, Agent, or Firm* — InventIQ Legal LLP; Steven J. Cahill

(57) ABSTRACT

A programmable integrated circuit includes configuration circuitry configured to receive configurations of a user design for the programmable integrated circuit. Each of the configurations implements the user design using at least some unique circuitry in the programmable integrated circuit relative to the other ones of the configurations. The configuration circuitry is further configured to implement the user design in a first one of the configurations. The configuration circuitry is further configured to move the user design from the first one of the configurations to a second one of the configurations to cause effects of aging processes in circuits in the programmable integrated circuit that are not aged by the first one of the configurations.

20 Claims, 6 Drawing Sheets

(56) References Cited

U.S. PATENT DOCUMENTS

| | | | | |
|---|---|---|---|---|
| 8,578,312 | B2* | 11/2013 | Papanikolaou | G06F 30/30 |
| | | | | 716/110 |
| 9,520,292 | B2* | 12/2016 | Potkonjak | H03K 17/161 |
| 2005/0140418 | A1 | 6/2005 | Muniandy et al. | |
| 2006/0106972 | A1 | 5/2006 | Gorobets et al. | |
| 2010/0269150 | A1* | 10/2010 | Potkonjak | G06F 21/10 |
| | | | | 726/34 |
| 2013/0080090 | A1* | 3/2013 | Potkonjak | G06F 17/00 |
| | | | | 702/58 |
| 2014/0176116 | A1 | 6/2014 | Kumar et al. | |
| 2014/0225639 | A1* | 8/2014 | Guo | H03K 5/156 |
| | | | | 331/46 |
| 2016/0378826 | A1* | 12/2016 | Bensberg | G06F 16/24552 |
| | | | | 707/721 |
| 2017/0220384 | A1* | 8/2017 | Anderson | G06F 9/4893 |
| 2019/0095571 | A1* | 3/2019 | Cheng | G06F 30/34 |

* cited by examiner

TECHNIQUES FOR REDUCING UNEVEN AGING IN INTEGRATED CIRCUITS

CROSS REFERENCE TO RELATED APPLICATION

This patent application is a divisional of U.S. patent application Ser. No. 15/714,361, filed Sep. 25, 2017, which is incorporated by reference herein in its entirety.

FIELD OF THE DISCLOSURE

The present disclosure relates to electronic circuits, and more particularly, to techniques for reducing uneven aging in electronic integrated circuits.

BACKGROUND

In modern process technologies for fabricating electronic semiconductor integrated circuits, various processes exist that degrade the performance of the transistors within the integrated circuits over time. Examples of these processes include hot carrier injection (HCI), negative-bias temperature instability (NBTI), and electro-migration (EM). These processes occur in different circumstances and have different consequences on circuits. As examples, one or more of these processes may change the threshold voltages and/or the drain currents of some transistors in an integrated circuit.

DETAILED DESCRIPTION

Figure 1:
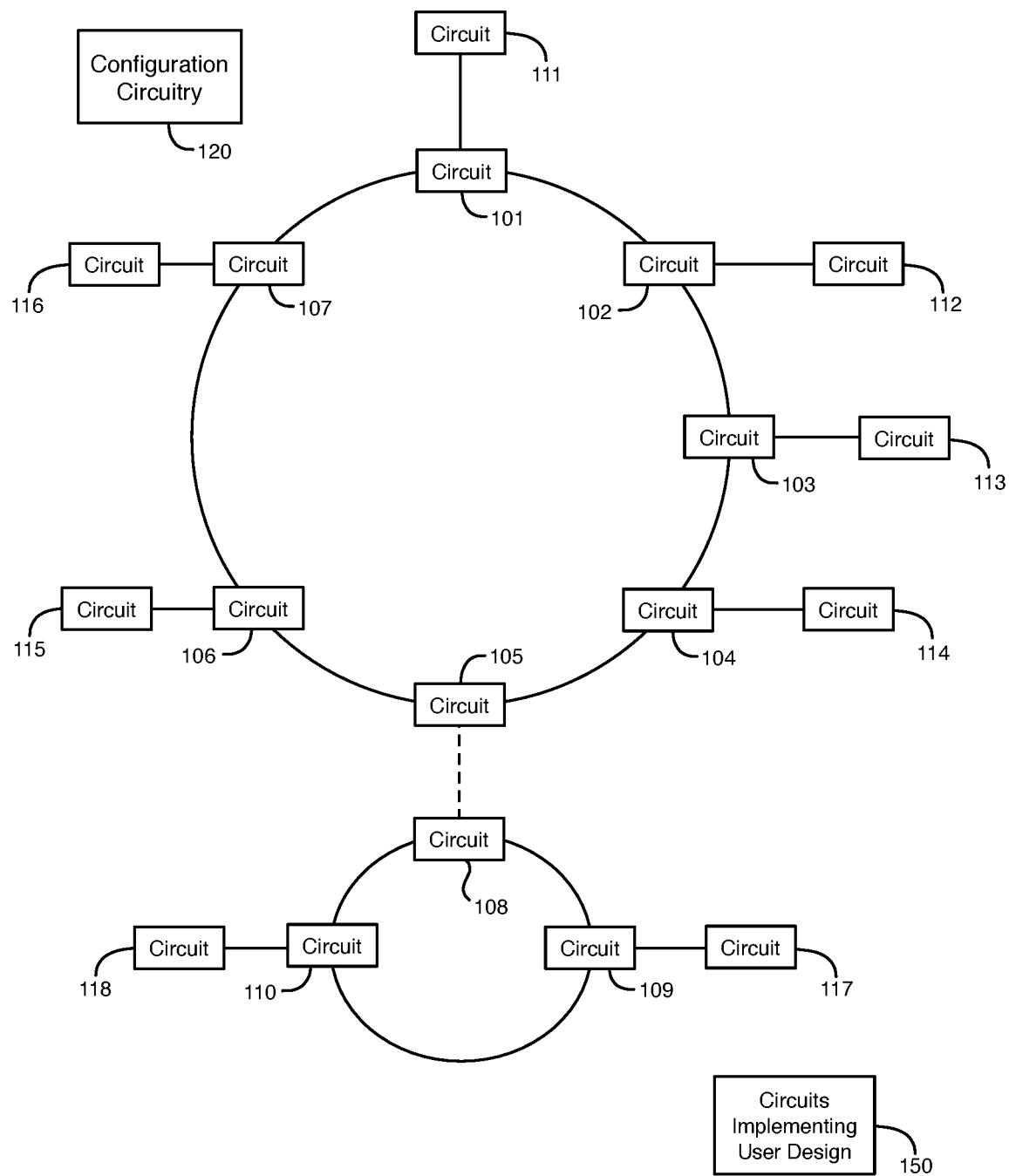
FIG. 1 illustrates an example of circuitry that may be used to generate switching activity in circuits that are unused by a user design for an integrated circuit, according to an embodiment.

As discussed above, HCI, NBTI, and EM are examples of processes that can degrade the performance of transistors in a semiconductor integrated circuit. These processes are referred to as aging processes. Frequently, the progression of the effects of degradation caused by aging processes in a circuit is related to the electrical activity of the circuit. Typically, the progression of the effects of degradation caused by aging processes is more evenly distributed across an integrated circuit if electrical activity is distributed more uniformly within the integrated circuit.

As an example, in a programmable logic integrated circuit such as a field programmable gate array (FPGA), most of the resources are unused in any specific user configuration. An FPGA is typically overprovisioned with circuitry to allow for a large population of different user designs to fit into a small number of FPGA devices. Some user designs only need a small percentage of the memories, the logic elements, and/or the digital signal processing circuit blocks in an FPGA. At a finer grain, utilization of circuit resources within an FPGA is also low. The placement of both the routing resources and the logic elements in an FPGA has a large effect on performance and efficiency. Therefore, there is some overprovisioning of these resources to allow different locations to be available under different circumstances.

Because the degradation effects caused by aging processes are associated with the activity of circuits, and because much of an FPGA may be inactive in a user design for the FPGA, each resource in an FPGA ideally has a timing characterization that comprehends the full range of degradation effects. An FPGA typically can be reconfigured at any point in its lifetime. A reconfigured user design for an existing FPGA may, for example, be using some resources that have had no usage up to this point in the existence of the FPGA and other resources that have been used at the maximum activity for the useful lifetime of the FPGA. If an FPGA is reconfigured, the degradation effects of aging processes may cause the timing characteristics of circuit blocks within the FPGA to change significantly. Allowing for this possibility, each of the resources in an FPGA has a wide timing range, which lowers system performance.

The aging processes in modern process technologies for fabricating semiconductor integrated circuits correspond with circuit activity, but the progression of the degradation effects of these aging processes is not linear with circuit activity. It is therefore possible to reduce the difference in degradation effects by creating some switching activity in unused circuitry within an integrated circuit.

A variety of techniques are disclosed herein for activating different portions of an integrated circuit (IC) that are not activated by a user design for the IC. As an example, unused configurable circuit resources of a programmable IC may be coupled to create varying signals that generate switching activity. As another example, one or more signal generator circuits in an IC may generate one or more low frequency signals that are used to create activity in unused circuit resources in the IC. Further details of these exemplary embodiments and other embodiments are provided below.

FIG. 1 illustrates an example of circuitry that may be used to generate switching activity in circuits that are unused by a user design for an integrated circuit, according to an embodiment. Figure (FIG. 1 illustrates circuits 101-118 and configuration circuitry 120 in an integrated circuit (IC). Circuits 101-118 may be any types of circuits. As examples that are not intended to be limiting, circuits 101-118 may be programmable logic circuits (e.g., that include combinatorial and sequential circuits), memory circuits, digital signal processing circuits, or any combination thereof. Examples of some of these types of circuits are disclosed herein with respect to FIG. 3. The circuitry of FIG. 1 may be, for example, in a programmable logic integrated circuit, a microprocessor, a graphics processing unit (GPU), or a hybrid of two or more of these types of integrated circuits.

The user design for the IC is implemented by circuits 150. Circuits 101-118 are not used (i.e., not activated) by the user design for the IC during the normal operation of the IC (e.g., the user mode). If circuits 101-118 were not subject to any electrical switching activity during use of the IC, circuits 101-118 would not experience the same degradation effects caused by the aging processes as the circuits in the IC that are used by the user design for the IC.

FIG. 1 illustrates a technique for creating electrical switching activity in circuits 101-118 by coupling together circuits 101-107 as a first ring oscillator circuit and/or coupling circuits 108-110 as a second ring oscillator circuit. Varying low frequency signals propagate through the ring oscillator circuits during the normal operation of the IC to create switching activity in circuits 101-118. Switching activity (or electrical switching activity) refers to transistors in the circuits turning on and off. The varying signals may be provided to other circuits 111-118 that are not coupled in the ring oscillators to create switching activity in these circuits 111-118. The electrical switching activity that is created in circuits 101-118 by the ring oscillator circuits simulates the aging processes to cause degradation effects in circuits 101-118 that are similar to the circuits in the integrated circuit (IC) that are used by the user design during normal operation of the IC.

Configuration circuitry 120 couples circuits 101-118 together as shown in FIG. 1. Examples of the configuration circuitry 120 are disclosed herein with respect to FIG. 2. The configuration circuitry 120 couples circuits 101-107 in a first loop circuit and/or couples circuits 108-110 in a second loop circuit. The first loop circuit may be coupled to or decoupled from the second loop circuit. The configuration circuitry 120 configures each of the circuits 101-107 to invert the signal that is transmitted through the first loop circuit. Because the first loop circuit has an odd number of inverting circuits, the first loop circuit is configured to function as a first ring oscillator circuit. The configuration circuitry 120 may also configure each of the circuits 108-110 to invert the signal that is transmitted through the second loop circuit. If circuits 108-110 are coupled in a second loop circuit having an odd number of inverting circuits, the second loop circuit is configured to function as a second ring oscillator circuit. The configuration circuitry 120 couples circuits 111-118 to circuits 101-110 as shown in FIG. 1.

The configuration circuitry 120 may couple circuits 101-118 as shown in FIG. 1, for example, through a programmable routing network of conductors in a programmable logic integrated circuit, microprocessor, or hybrid thereof. An example of such a programmable routing network of conductors is disclosed herein with respect to FIG. 3. As another example, the configuration circuitry 120 may couple circuits 101-118 as shown in FIG. 1 through a configuration network of conductors using firmware. During a configuration mode of a programmable IC, the configuration network of conductors is used to route configuration data to programmable logic circuits in the IC. The configuration data may be used to configure the programmable logic circuits in circuits 101-118, for example, to implement the first and/or second ring oscillator circuits. The configuration network of conductors is not used during the normal operation of the IC to route configuration data. Therefore, the configuration network of conductors may be used to route signals between circuits 101-118 to implement switching activity as described below.

During the normal operation of the IC when circuits 101-118 are not used by the user design for the IC, configuration circuitry 120 couples circuits 101-107 in a ring oscillator circuit configuration as shown in FIG. 1. The configuration circuitry 120 configures each of circuits 101-107 to invert a signal that passes through that circuit in the loop of the ring oscillator. Because an odd number of inverter circuits are coupled in a loop, a logic state transition propagates through circuits 101-107 within the ring oscillator circuit. Thus, each of the circuits 101-107 includes an inverter that inverts the signal received in the first loop circuit to generate a continuously toggling logic signal propagating through the first ring oscillator circuit. For example, the logic state transition may propagate through the first ring oscillator circuit from circuit 101 to circuits 102, 103, 104, 105, 106, 107, in that order, and then back to circuit 101. When the toggling signal reaches an input of circuit 101, circuit 101 inverts its output signal, and the toggling signal continues to propagate through the first ring oscillator circuit as long as power is supplied to the integrated circuit. The toggling signal may be a low frequency signal that creates low frequency switching activity in the transistors in circuits 101-107 to simulate the degradation effects caused by aging processes without consuming a substantial amount of power. A low frequency signal may be created by coupling several circuits in the first ring oscillator circuit (e.g., dozens, hundreds, or thousands of circuits), as long as there are an odd number of inversions within one loop of the ring oscillator circuit. Seven circuits 101-107 are shown as being coupled in the first ring oscillator circuit merely as an example.

Additional circuits 111, 112, 113, 114, 115, and 116 are coupled to circuits 101, 102, 103, 104, 106, and 107, respectively. The toggling output signals of circuits 101, 102, 103, 104, 106, and 107 that are generated by the first ring oscillator circuit may also be provided to inputs of circuits 111, 112, 113, 114, 115, and 116, respectively. The toggling output signals create switching activity in the transistors in circuits 111, 112, 113, 114, 115, and 116 to simulate the degradation effects caused by aging processes.

In an embodiment, configuration circuitry 120 couples circuits 108-110 in a second ring oscillator circuit configuration as shown in FIG. 1 during the normal operation of the IC when circuits 101-118 are not used by the user design for the IC. The configuration circuitry 120 configures each of circuits 108-110 to invert a signal that passes through that circuit in the loop of the ring oscillator. Because an odd number of inverter circuits are coupled in the loop, a logic state transition propagates through circuits 108-110 within the second ring oscillator circuit. Thus, each of the circuits 108-110 includes an inverter that inverts the signal received in the second loop circuit to generate a continuously toggling signal propagating through the second ring oscillator circuit as long as power is supplied to the integrated circuit. The toggling signal may be a low frequency signal that creates low frequency switching activity in the transistors in circuits 108-110 to simulate the degradation effects caused by aging processes without consuming a substantial amount of power. The low frequency signal may, for example, be created by coupling several circuits in the second ring oscillator circuit (e.g., dozens, hundreds, or thousands of circuits), as long as there are an odd number of inversions within one loop of the ring oscillator circuit. Three circuits 108-110 are shown as being coupled in the second ring oscillator circuit merely as an example.

In another embodiment, logic state transitions in the output signal of circuit 105 are provided to an input of circuit 108 to generate signal oscillations within circuits 108-110 to simulate switching activity in these circuits. In this embodiment, circuit 110 may be decoupled from circuit 108.

Circuits 117-118 are coupled to outputs of circuits 109-110, respectively, as shown in FIG. 1. The toggling output signals of circuits 109-110 are also provided to inputs of circuits 117-118. The toggling output signals of circuits 109-110 create switching activity in the transistors in circuits 117-118 to simulate the degradation effects caused by aging processes.

According to further embodiments, the integrated circuit (IC) may include additional ring oscillator circuits that couple together additional circuits that are unused by the user design for the IC. The additional ring oscillator circuits generate varying signals (e.g., low frequency signals) that cause switching activity in the otherwise unused circuits during the normal operation of the IC in order to simulate the degradation effects of the aging processes discussed above.

Figure 2:
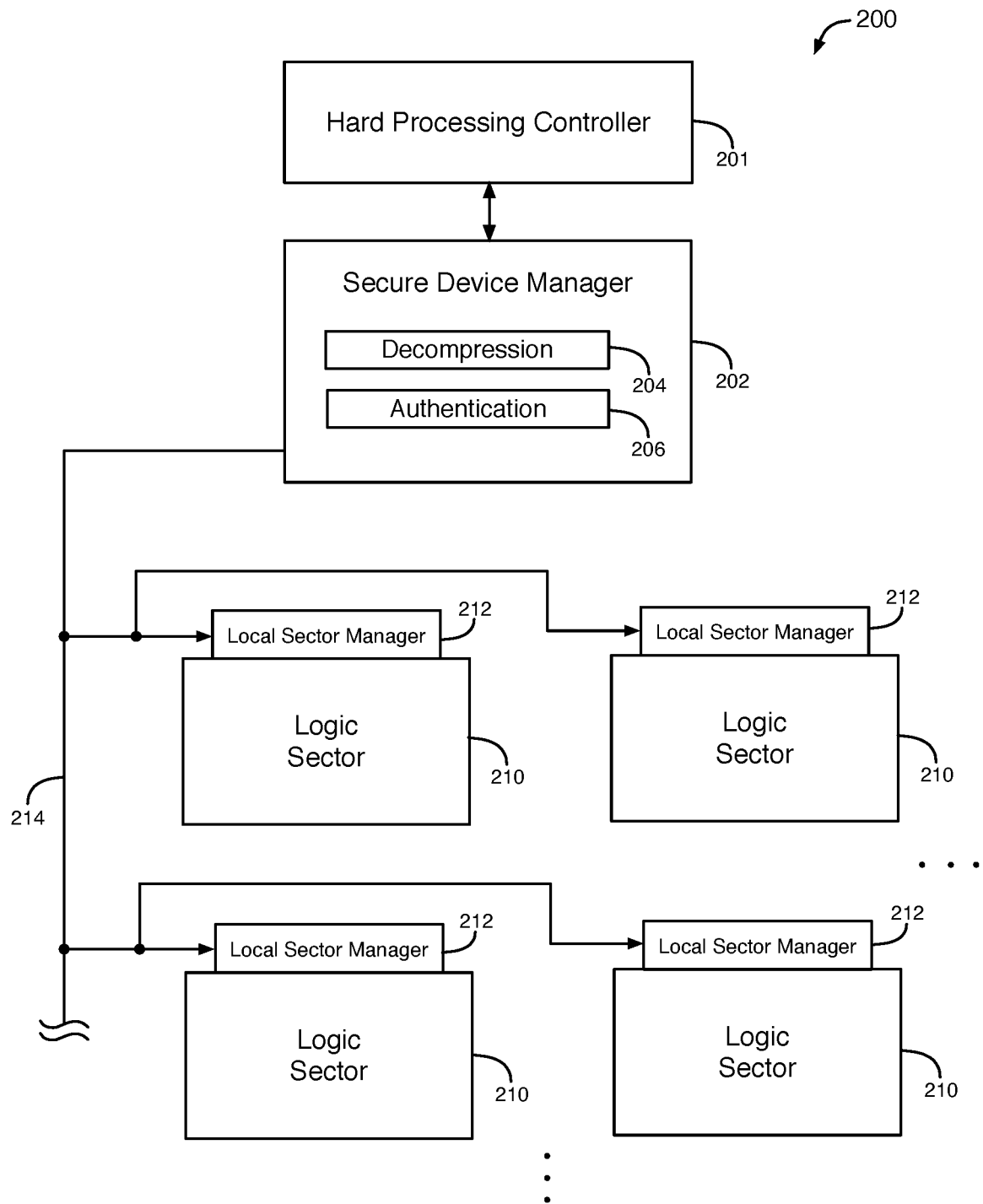
FIG. 2 illustrates further details of circuitry in an exemplary integrated circuit, according to an embodiment.

FIG. 2 illustrates further details of an exemplary integrated circuit 200, according to an embodiment. Integrated circuit (IC) 200 includes hard processing controller circuit 201, secure device manager circuit 202, multiple logic sector circuits 210, and multiple local sector manager circuits 212. Each logic sector 210 may be managed by a respective one of local sector managers (LSM) 212. Local sector managers 212 may be managed by secure device manager 202. Hard processing controller 201 may receive configuration data (e.g., configuration bit streams), requests, and/or commands from a host processor. Secure device manager (SDM) 202 may receive the configuration data, the requests, and the commands from hard processing controller 201. Hard processing controller 201 may, for example, be a microprocessor. Secure device manager 202 may provide commands, configuration data, and requests to local sector managers 212 over a bus 214. Bus 214 may be part of a configuration network of conductors.

In some instances, the configuration data may optionally be compressed and authenticated. Thus, secure device manager 202 may include decompression engine 204 and authentication engine 206 for decompressing and authenticating data received from the host processor through hard processing controller 201.

Logic sectors 210 may be individually configurable/programmable. Thus, each of logic sectors 210 may independently process different functions in parallel. The parallel processing enabled by logic sectors 210 may be utilized to perform a variety of functions simultaneously by reconfiguring different subsets of the logic sectors to perform the functions.

One or more of controller 201, SDM 202, and/or LSMs 212 may be the configuration circuitry 120 disclosed herein with respect to FIG. 1. SDM 202 or LSMs 212 may store firmware that configures the unused circuits in logic sectors 210 and programmable connections in bus 214 to form and implement one or more ring oscillator circuits, as disclosed herein with respect to FIG. 1. Circuits within the logic sectors 210 that are unused by a user design for IC 200 may be coupled together using bus 214 (and/or other conductors) to form one or more ring oscillator circuits that generate varying/toggling signals to provide switching activity to these otherwise unused circuits, as discussed above.

According to other embodiments, SDM 202 or one or more of LSMs 212 may generate one or more varying, low frequency signals that are transmitted to one or more circuits that are unused by a user design for IC 200 in order to generate switching activity in these otherwise unused circuits. SDM 202 and/or one or more of LSMs 212 may contain firmware that is used to generate these low frequency signals (e.g., using timer circuits). Each low frequency signal generated by SDM 202 or one of LSMs 212 may be transmitted to numerous circuits in the IC to generate switching activity through a network of conductors. As an example, SDM 202 or one of LSMs 212 may generate a low frequency signal that is transmitted to one or more of the logic sectors 210 shown in FIG. 2 that are not used by the user design for the IC 200 through conductors in bus 214. The logic sectors 210 that receive the low frequency signal do not need to be coupled in a loop or ring oscillator configuration, because SDM 202 or one of LSMs 212 toggles the low frequency signal. Firmware in SDM 202 or in one or more of LSMs 212 may generate very low frequency signals that may have lower frequencies than signals generated by a ring oscillator circuit. The very low frequency signals may be used to generate low power switching activity in otherwise unused circuits.

Figure 3:
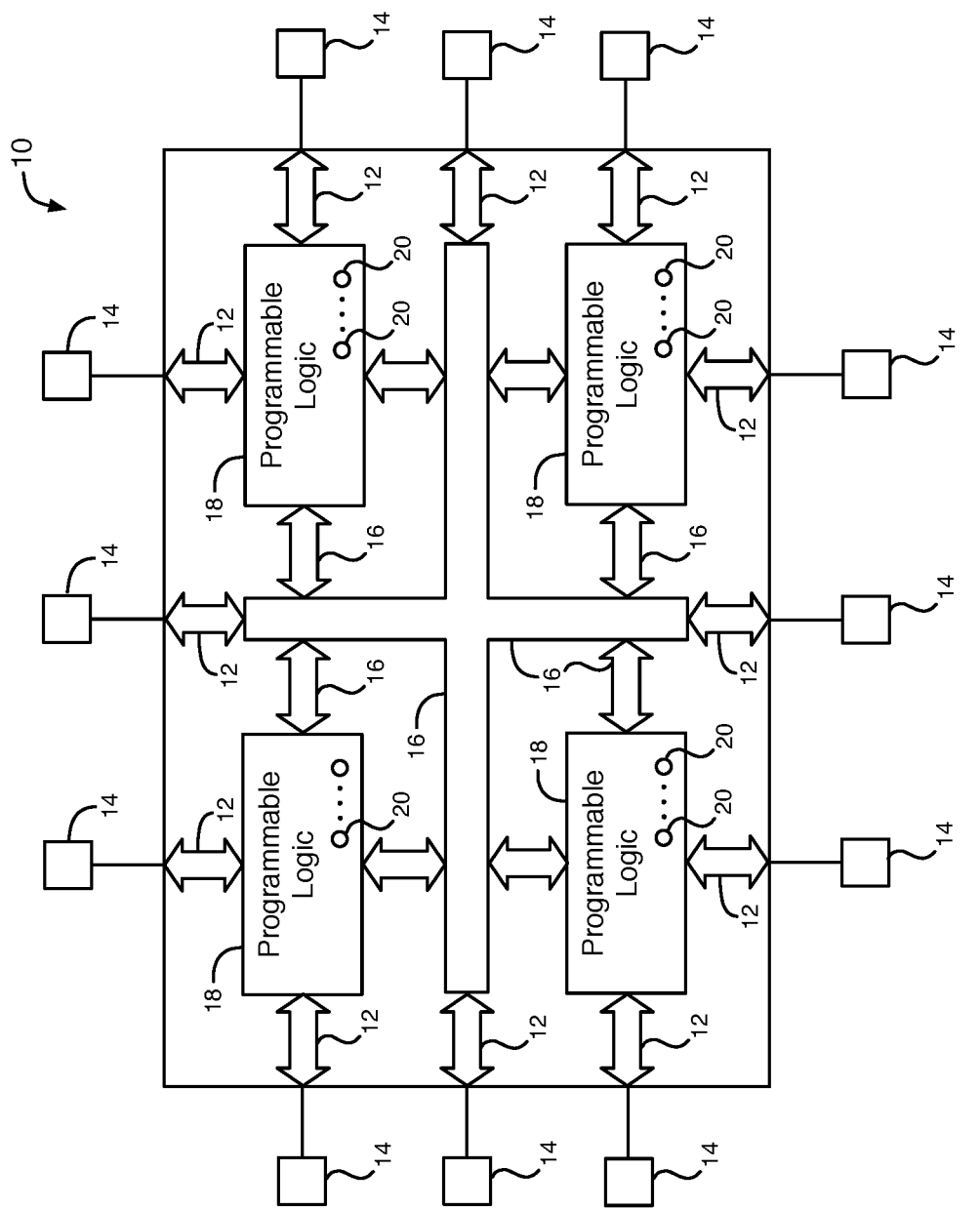
FIG. 3 illustrates an exemplary programmable integrated circuit that may be used to implement the integrated circuit of FIG. 2, according to an embodiment.

Integrated circuit 200 may be, for example, a programmable integrated circuit. An illustrative programmable logic integrated circuit 10 that may be used to implement IC 200 is shown in Figure (FIG. 3. Programmable logic integrated circuit (IC) 10 may be, for example, a programmable logic device (PLD) or a field programmable gate array (FPGA). As shown in FIG. 3, programmable logic IC 10 may have input-output circuitry 12 for driving signals off of IC 10 and for receiving signals from other devices via input-output pins 14. A programmable routing network 16 of conductors such as global and local vertical and horizontal conductive lines and buses may be used to route signals in IC 10. Network 16 includes fixed interconnects (conductive lines) and programmable interconnects (i.e., programmable connections between respective fixed interconnects). Programmable logic 18 may include combinational and sequential logic circuitry. Programmable logic 18 may be configured to perform custom logic functions of a user design.

Programmable logic IC 10 contains memory elements 20 that can be loaded with configuration data using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. In the context of programmable integrated circuits, the memory elements 20 store configuration data and are therefore sometimes referred to as configuration random access memory (CRAM) cells.

The configuration of programmable resources such as routing multiplexer circuits may create transistors that are switching and one or more transistors that are not switching (e.g., in the paths from inputs that are disabled). Thus, one configuration of programmable resources may only create switching activity in a portion of the IC. This problem manifests in both the circuits in the IC that are unused by the user design and in portions of the circuits that are used by the user design.

Figure 4:
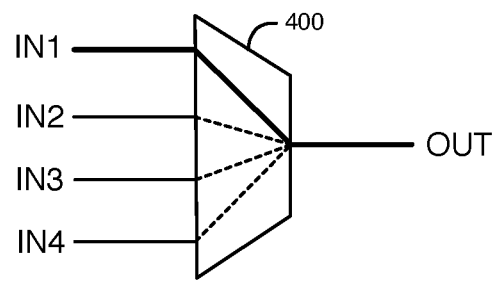
FIG. 4 illustrates an example of a 4-to-1 routing multiplexer circuit, according to an embodiment.

FIG. 4 illustrates an example of a 4-to-1 routing multiplexer circuit 400, according to an embodiment. Only one input of the routing multiplexer circuit 400 can be used at any one time to route an input signal to the output OUT of the multiplexer circuit 400. In the example of FIG. 4, multiplexer circuit 400 is configured to route an input signal IN1 to its output OUT. In response to input signal IN1 toggling, transistors in the signal path from IN1 to OUT generate switching activity. However, transistors in the signal paths from input signals IN2-IN4 to OUT may not generate switching activity, and therefore, these transistors may not experience the effects associated with the aging processes discussed above even if multiplexer circuit 400 is used in a user design.

Figure 5:
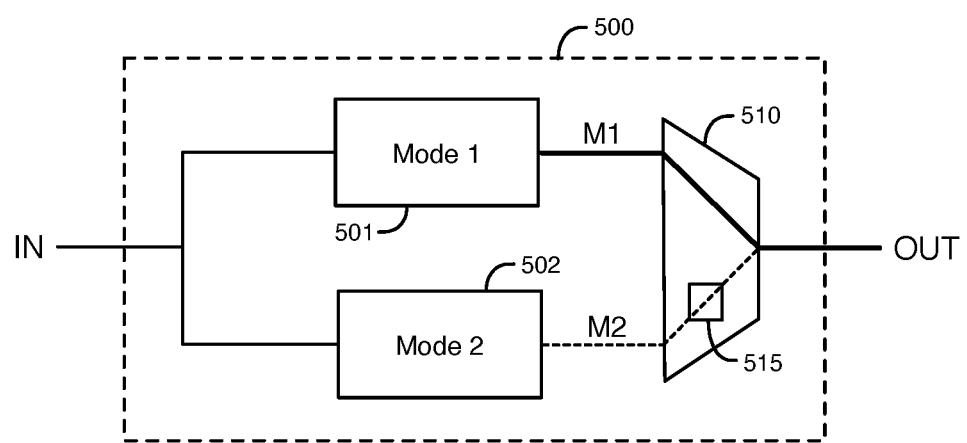
FIG. 5 illustrates a configurable circuit block with a routing multiplexer circuit and two mutually exclusive modes, according to an embodiment.

FIG. 5 illustrates a configurable circuit block 500 with a routing multiplexer circuit 510 and two mutually exclusive modes 501-502, according to an embodiment. In the example of FIG. 5, the path from one selected input of multiplexer circuit 510 to the output of the multiplexer is activated, but there are transistors 515 in the other input path that are not switched, and therefore see no effects associated with the aging processes. The two exclusive modes 501-502 are implemented by different circuits in block 500. In the example shown in FIG. 5 for configurable circuit block 500, the signal path from the shared input IN through mode 1 501 and signal path M1 is used to route a signal from IN to the output OUT. Toggling of the input signal at the shared input IN creates switching activity in transistors in mode 1 501. Toggling of the input signal at IN may also create switching activity in transistors in mode 2 502 that stimulate the aging processes. However, the signal path M2 (shown by the dotted lines) from the output of mode 2 502 to the output OUT of circuit block 500 contains transistors 515 that are not switched. FIG. 5 illustrates just one example of how transistors in a circuit block in a user design may not be switched. Numerous and more complex circuit blocks in a user design may also contain transistors that are not switched during normal operation of the IC.

According to some embodiments, a programmable integrated circuit (IC) may be reconfigured to activate different circuits within the IC in order to more evenly distribute the effects of the aging processes throughout the IC. In an embodiment, multiple configurations of a user design for a programmable IC may be used during normal operation of the IC to improve the coverage of switching activity in circuits that are not used by an initial configuration of the user design, such as multiplexers, lookup table circuits, memory circuits, and digital signal processing units. In this embodiment, the user design may be moved from one configuration in the IC to another configuration in the IC.

To implement this embodiment, all of the circuit blocks in an IC that are unused by a user design may be added to a set. The different input and output paths that need to be exercised with switching activity are added to a database. A router routes a tree from any frequency source outwards to attempt to cover as many input and output signal paths as possible using only circuit blocks in the IC that are unused in the initially placed and routed configuration that is generated for a user design. Once this tree can no longer progress to additional unused circuit blocks, the router starts from any other frequency source to attempt to maximize its reach through additional unused circuit blocks to generate another tree. The router may use placement and routing techniques for a programmable logic IC to generate these trees. Once this process has been completely exhausted, the set of trees is compiled as one configuration in the set of configurations for the user design that will be used to age the IC. The paths that are toggled by this configuration are then removed from the database. Then, the router performs another series of tree routes using placement and routing techniques to create another configuration for the user design. This process repeats until all of the signal paths are covered, or until there is proof that some circuit blocks are inaccessible. These functions, including the functions of the router, may be performed, for example, by design tool software operating on a computer or in the IC.

The result of this process is a number of configurations consisting of circuit blocks unused by the initial configuration for the user design, which can be reconfigured into the IC to generate a more even toggle activity on as many transistors as possible. Each of these configurations implements the user design and satisfies the user's timing constraints for the user design. Ideally, the least number of configurations for a user design generate the most utilization of circuit blocks in the IC as possible. Two or more of these configurations may in some embodiments use some of the same circuit blocks, but preferably have as little overlap as possible. The configuration circuitry toggles the user design between these configurations (e.g., when the IC is idle) in order to more evenly distribute switching activity throughout the IC.

Figure 6:
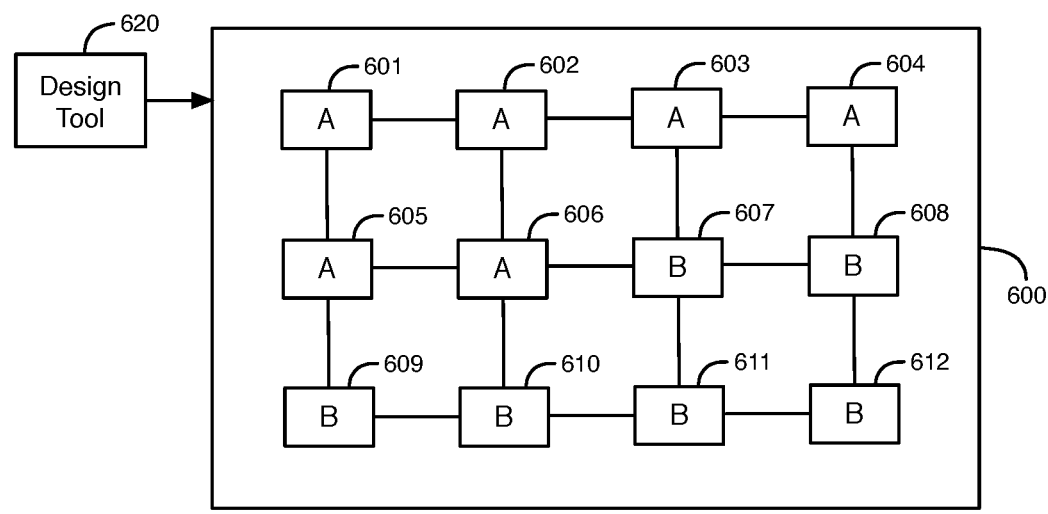
FIG. 6 illustrates an example of how configuration circuitry in a programmable integrated circuit (IC) may toggle a user design between multiple configurations in order to spread switching activity to more circuits in the IC, according to an embodiment.

FIG. 6 illustrates an example of how configuration circuitry in a programmable integrated circuit (IC) may toggle a user design between multiple configurations in order to spread switching activity to more circuit blocks in the IC, according to an embodiment. In the example of FIG. 6, IC 600 includes 12 programmable circuit blocks 601-612. Two configurations A and B of a user design for IC 600 are generated by a design tool 620 operating on a computer. The first configuration A of the user design for IC 600 is placed in circuit blocks 601-606. The second configuration B of the user design for IC 600 is placed in circuit blocks 607-612. Each of the configurations A and B performs the same basic functions of the user design when the respective configuration A or B is activated. Configuration circuitry in IC 600 toggles the user design between configurations A and B in order to spread switching activity between circuit blocks 601-606 and circuit blocks 607-612. The user design may be switched between configurations A and B when the user design is idle. Spreading the switching activity generated by the user design causes the degradation effects of the aging processes discussed herein to be more evenly spread across the IC. The user design may be toggled between configurations A and B (and possibly additional configurations), for example, after a system reboot.

According to another embodiment, configuration circuitry in a programmable IC may toggle a user design for the IC between two or more different configurations that utilize different circuits or other resources within the same circuit blocks. For example, configuration circuitry may toggle a user design between a first configuration A1 that utilizes a first set of circuits within circuit blocks 601-606 and a second configuration A2 that utilizes a second set of circuits within circuit blocks 601-606. An example of how functions of a user design can be placed differently within the same circuit block are the exclusive modes 1 and 2 disclosed herein with respect to FIG. 5 implementing different functions of different configurations at different times. The user design may be switched between configurations A1 and A2 when the user design is idle. Each of the configurations A1 and A2 performs the same basic functions of the user design when the respective configuration A1 or A2 is activated. Toggling the user design between configurations A1 and A2 may spread switching activity between the first and second sets of circuits to stimulate the aging processes in more transistors within circuit blocks 601-606. Configurations A1 and A2 may be generated by design tool 620.

According to yet another embodiment, a user design for a programmable integrated circuit (IC) may be partially reconfigured to improve the coverage of switching activity on circuits that are not used by an initial configuration of the user design. The unused circuits may include, for example, multiplexers, lookup table circuits, memory circuits, and digital signal processing units. Partial reconfiguration of a portion of a user design for a programmable IC may be performed to relocate the portion of the user design within the IC to allow for aging processes to occur in the transistors that are blocked by one configuration of the user design.

A user design may be moved between multiple configurations having different circuit blocks or different utilizations of the same circuit blocks. Each of the multiple configurations of the user design may have a different set of aging configurations. The configuration circuitry may iterate through the multiple configurations of the user design. While a particular user configuration is operating, partial reconfiguration may be used to generate the aging effects on unused circuits. An objective of a large set of configurations for the user design may be to create a uniform aging profile for each IC running a user design.

A user design for a programmable IC may, for example, be reconfigured in full or partially reconfigured after a reboot of the IC. User designs that hold little persistent state, or where the state can be drained, or which are used periodically and swapped with other user designs may have the application of reconfiguration take place without a full reboot of the IC. However, if the user design contains a substantial amount of state information, or if the user design cannot be stopped or rebooted for some other reason, a user design may be segmented in different segments, and one or more of these segments can be partially reconfigured without affecting other segments of the user design. The different segments of the user design may, for example, only communicate with each other on a more limited basis than circuitry within each segment.

Figure 7:
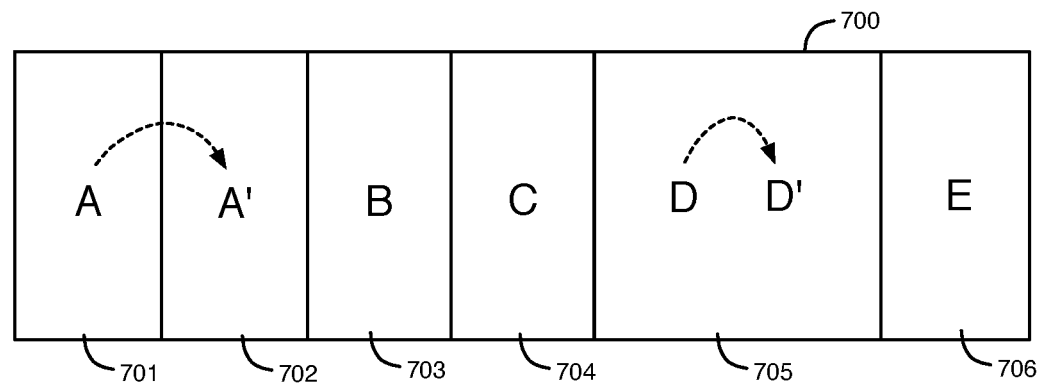
FIG. 7 illustrates an example of a user design for a programmable IC that is partially reconfigured in order to spread switching activity between a larger number of circuits to stimulate the effects of aging, according to an embodiment.

FIG. 7 illustrates an example of a user design for a programmable IC that is partially reconfigured in order to spread switching activity between a larger number of circuits to stimulate the effects of aging, according to an embodiment. FIG. 7 illustrates a user design 700 for a programmable IC that contains at least 5 different portions. These 5 different portions of user design 700 may be segmented or non-segmented. User design 700 may be partially reconfigured by moving the first portion of the user design from a first configuration A in a region 701 of the IC containing a first set of circuit blocks to a second configuration A' in a region 702 of the IC containing a second set of circuit blocks. Each of the configurations A and A' performs the same functions of the user design when the respective configuration A or A' is activated.

The user design 700 may also be partially reconfigured by toggling the fourth portion of the user design between two or more different configurations D and D' that utilize different circuits or other resources within the same circuit blocks in region 705 of the IC. Each of the configurations D and D' performs the same functions of the user design when the respective configuration D or D' is activated. Each of the two different configurations D and D' utilize at least some different circuits within the same circuit blocks in region 705. As an example, configurations D and D' may utilize different modes within the circuit blocks to activate different transistors (e.g., including transistors 515) within multiplexers, as disclosed herein with respect to FIG. 5. As other examples, configurations D and D' may utilize different lookup tables or different registers within the same circuit blocks.

In the embodiment of FIG. 7, configurations B, C, and E of the user design remain configured in the circuit blocks in regions 703, 704, and 706, respectively, of the IC before and after each partial reconfiguration between configurations A and A' and configurations D and D'. In other alternative embodiments, one or more of configurations B, C, and E may also be partially reconfigured to simulate the effects of aging in different circuit blocks or different transistors within the same circuit blocks. Configurations A-E may, for example, be generated by a design tool.

In some embodiments, the complexity of evenly distributing toggling between different configurations may be too great for some user designs that need to persist indefinitely in the same circuits in a programmable IC. In these embodiments, if a design tool recognizes that regions of a user design are persistent for as long as the IC is in service, or are persistent for indefinite periods of time (but where there might be some user change in the future), the design tool may prevent these regions of the user design from being reconfigured. These regions of the IC, which may be specified by the user, have different aging characteristics. The different degradation effects caused by the different aging characteristics in these regions of the user design can be ignored by the design tool, because of the assumption that these regions of the user design will not be moved (or are unlikely to be moved) to different circuits in the IC at a future time. Thus, for a user design or portions thereof that are guaranteed to persist for the lifetime of the IC, the design tool does not have to consider the disparity of age between unused and used resources. Portions of a user design that might have some change in the future may allow for disparity of aging in the circuits used by the user design using the techniques disclosed herein.

Figure 8:
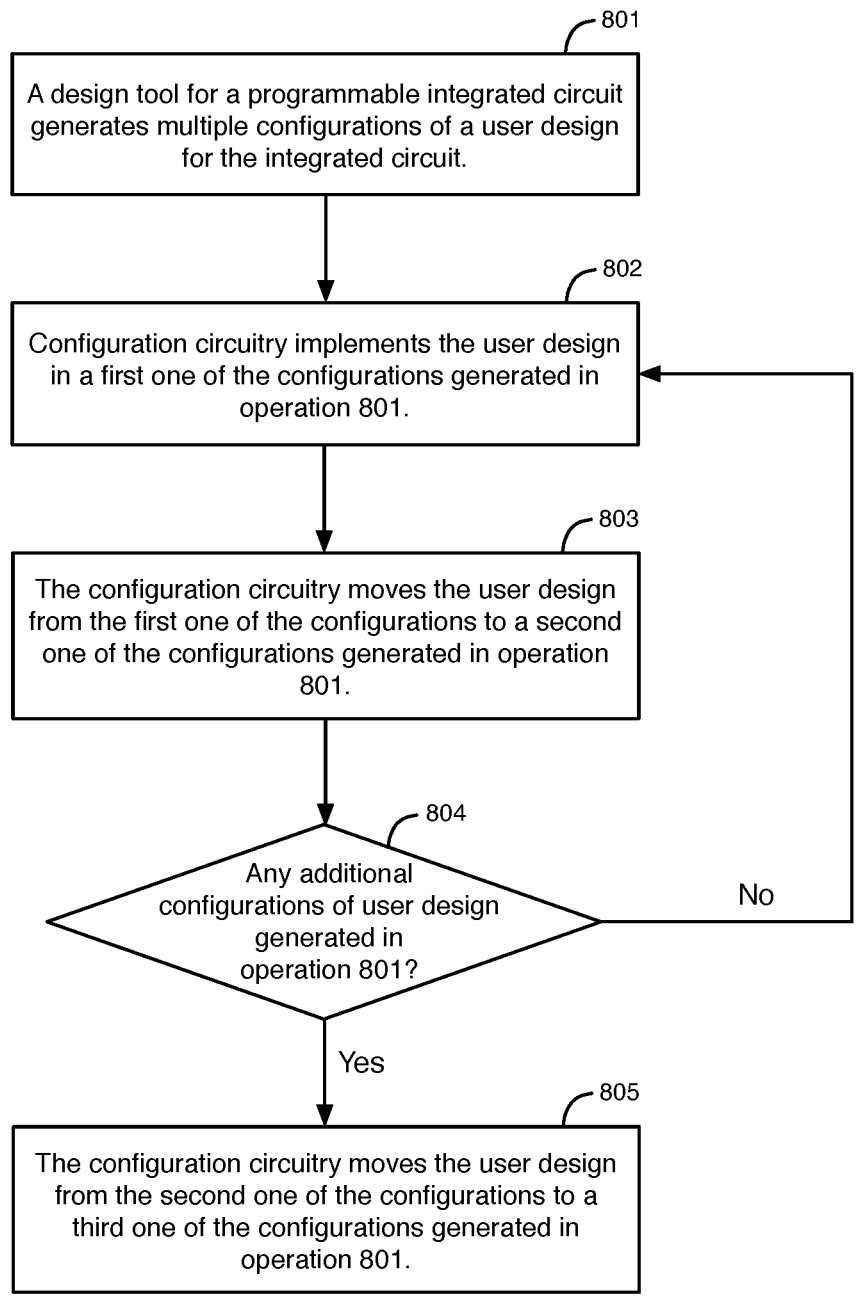
FIG. 8 illustrates examples of operations that may be performed to reconfigure a programmable integrated circuit (IC) in order to more evenly distribute the effects of aging processes throughout the IC, according to an embodiment.

FIG. 8 illustrates examples of operations that may be performed to reconfigure a programmable integrated circuit (IC) in order to more evenly distribute the effects of aging processes throughout the IC, according to an embodiment. In operation 801, a design tool for a programmable IC generates multiple configurations of a user design for the IC. The design tool may, for example, be implemented on a computer. Each one of the configurations of the user design implements the same basic functionality of the user design in the IC, while using at least some different circuits in the IC. The multiple configurations for the user design may include different configurations of the entire user design and/or partial reconfigurations of portions of the user design. The different configurations may include different placements of portions of or all of the user design. Two or more of the different configurations may include different utilizations of circuits within the same circuit blocks in the IC.

In operation 802, configuration circuitry implements the user design in a first one of the configurations generated in operation 801. In operation 803, the configuration circuitry moves the user design from the first one of the configurations to a second one of the configurations generated in operation 801. Operation 803 may be performed a substantial period of time after operation 802, such that switching between the first and second ones of the configurations does not interrupt the performance of the user design. Implementing the user design in the second one of the configurations causes effects of aging processes in transistors that are not aged by the first one of the configurations. In decision operation 804, the configuration circuitry determines if additional configurations of the user design were generated in operation 801. If no additional configurations of the user design were generated in operation 801, the process of FIG. 8 returns to operation 802.

If a third configuration of the user design was generated in operation 801, the configuration circuitry moves the user design from the second one of the configurations to the third configuration in operation 805. Implementing the user design in the third configuration causes effects of aging processes in transistors that are not aged by the first and second ones of the configurations. Additional configurations of the user design generated in operation 801 may be implemented in additional operations after operation 805. After all of the configurations of the user design that were generated in operation 801 have been implemented in the IC, the process of FIG. 8 returns to operation 802. Each of the configurations of the user design may be implemented for any suitable period of time.

The embodiments disclosed herein may be incorporated into any suitable integrated circuit. For example, the embodiments may be incorporated into numerous types of devices such as programmable logic integrated circuits, application specific standard products (ASSPs), and application specific integrated circuits (ASICs). Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic integrated circuits described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic integrated circuits can be used to perform a variety of different logic functions. For example, a programmable logic integrated circuit can be configured as a processor or controller that works in cooperation with a system processor. The programmable logic integrated circuit may also be used as an arbiter for arbitrating access to a shared resource in the data processing system. In yet another example, the programmable logic integrated circuit can be configured as an interface between a processor and one of the other components in the system.

The following examples pertain to further embodiments. Example 1 is an integrated circuit comprising: first circuits that are configured to implement a user design for the integrated circuit; second circuits that are unused by the user design; and configuration circuitry that couples the second circuits together through a network of conductors, wherein transistors in the second circuits turn on and off in response to a varying signal that continues to propagate through the second circuits and through the network of conductors while the first circuits implement the user design.

In Example 2, the subject matter of Example 1 can optionally include wherein the configuration circuitry couples the second circuits as a ring oscillator circuit.

In Example 3, the subject matter of any one of Examples 1-2 can optionally further include third circuits that are unused by the user design, wherein the configuration circuitry couples the third circuits together through the network of conductors, and wherein transistors in the third circuits turn on and off in response to a varying signal that continues to propagate through the third circuits while the first circuits implement the user design.

In Example 4, the subject matter of Example 3 can optionally include wherein the configuration circuitry couples the third circuits as ring oscillator circuit.

In Example 5, the subject matter of Example 1 can optionally include wherein the configuration circuitry comprises a controller circuit that generates the varying signal and that provides the varying signal from the configuration circuitry to the second circuits through the network of conductors to generate switching activity in the transistors in the second circuits while the first circuits implement the user design.

In Example 6, the subject matter of any one of Examples 1-5 can optionally include wherein the integrated circuit is a programmable integrated circuit, wherein the first and second circuits comprise programmable logic circuits, and wherein the programmable logic circuits in the first circuits are configured to implement the user design.

In Example 7, the subject matter of any one of Examples 1-4 can optionally include wherein the integrated circuit is a programmable integrated circuit, wherein the first and second circuits comprise programmable logic circuits, and wherein the programmable logic circuits in the first circuits are configured to implement the user design, wherein the configuration circuitry configures the programmable logic circuits in the second circuits to function as a ring oscillator circuit having an odd number of inverter circuits coupled in a loop circuit.

Example 8 is a computer readable non-transitory medium storing executable instructions for reducing uneven aging in a programmable integrated circuit, the executable instructions comprising: instructions executable by a design tool to generate configurations of a user design for the programmable integrated circuit, wherein each of the configurations implements the user design using at least some unique circuitry in the programmable integrated circuit relative to the other ones of the configurations; instructions executable by the design tool to direct configuration circuitry in the programmable integrated circuit to implement the user design in a first one of the configurations; and instructions executable by the design tool to direct the configuration circuitry to move the user design from the first one of the configurations to a second one of the configurations to cause effects of aging processes in circuits in the programmable integrated circuit that are not aged by the first one of the configurations.

In Example 9, the subject matter of Example 8 can optionally further include instructions executable by the design tool to direct the configuration circuitry to move the user design from the second one of the configurations back to the first one of the configurations.

In Example 10, the subject matter of any one of Examples 8-9 can optionally further include instructions executable by the design tool to direct the configuration circuitry to move the user design from the second one of the configurations to a third one of the configurations to cause effects of the aging processes in circuits that are not aged by the first and second ones of the configurations.

In Example 11, the subject matter of Example 10 can optionally further include instructions executable by the design tool to direct the configuration circuitry to move the user design from the third one of the configurations back to the first one of the configurations.

In Example 12, the subject matter of any one of Examples 8-11 can optionally include wherein the instructions executable by the design tool to direct the configuration circuitry to implement the user design in the first one of the configurations further comprises instructions executable by the design tool to direct the configuration circuitry to configure first programmable circuit blocks in the programmable integrated circuit to implement the first one of the configurations, and wherein the instructions executable by the design tool to direct the configuration circuitry to move the user design from the first one of the configurations to the second one of the configurations further comprises instructions executable by the design tool to direct the configuration circuitry to configure second programmable circuit blocks in the programmable integrated circuit to implement the second one of the configurations, wherein at least some of the second programmable circuit blocks are different than the first programmable circuit blocks.

In Example 13, the subject matter of any one of Examples 8-11 can optionally include wherein the instructions executable by the design tool to direct the configuration circuitry to implement the user design in the first one of the configurations further comprises instructions executable by the design tool to direct the configuration circuitry to place the first one of the configurations in first circuits in a subset of programmable logic circuit blocks in the programmable integrated circuit, and wherein the instructions executable by the design tool to direct the configuration circuitry to move the user design from the first one of the configurations to the second one of the configurations further comprises instructions executable by the design tool to direct the configuration circuitry to place the second one of the configurations in second circuits in the subset of the programmable logic circuit blocks, wherein the second circuits are different than the first circuits.

In Example 14, the subject matter of any one of Examples 8-11 can optionally include wherein the instructions executable by the design tool to direct the configuration circuitry to move the user design from the first one of the configurations to the second one of the configurations further comprises instructions executable by the design tool to direct the configuration circuitry to partially reconfigure a part of the user design such that a first portion of the second one of the configurations is implemented by the same circuits as a first portion of the first one of the configurations and a second portion of the second one of the configurations is implemented by different circuits than a second portion of the first one of the configurations.

Example 15 is a method for reducing effects of uneven aging in an integrated circuit, the method comprising: configuring first circuits to implement a user design for the integrated circuit; coupling second circuits together through a network of conductors using configuration circuitry, wherein the second circuits are unused by the user design; and generating switching activity in the second circuits in response to a varying signal that propagates through the second circuits and through the network of conductors while the first circuits implement the user design.

In Example 16, the subject matter of Example 15 can optionally include wherein coupling second circuits together through the network of conductors using the configuration circuitry further comprises coupling the second circuits together to function as a ring oscillator circuit.

In Example 17, the subject matter of any one of Examples 15-16 can optionally further include coupling third circuits together through the network of conductors using the configuration circuitry, wherein the third circuits are unused by the user design; and generating switching activity in the third circuits in response to a varying signal that propagates through the third circuits while the first circuits implement the user design.

In Example 18, the subject matter of Example 17 can optionally include wherein coupling the third circuits together further comprises coupling the third circuits as a ring oscillator circuit using the configuration circuitry.

In Example 19, the subject matter of Example 15 can optionally include wherein generating switching activity in the second circuits in response to the varying signal further comprises generating the varying signal using a controller circuit and providing the varying signal from the controller circuit to the second circuits through the network of conductors to generate switching activity in the second circuits while the first circuits implement the user design.

In Example 20, the subject matter of any one of Examples 15-19 can optionally include wherein the integrated circuit is a programmable logic integrated circuit, and wherein the first and second circuits comprise programmable logic circuits.

Example 21 is a method for reducing uneven aging in a programmable integrated circuit, the method comprising: receiving configurations of a user design for the programmable integrated circuit from a design tool, wherein each of the configurations implements the user design with at least some unique circuitry in the programmable integrated circuit relative to the other ones of the configurations; implementing the user design in a first one of the configurations with configuration circuitry in the programmable integrated circuit; and moving the user design from the first one of the configurations to a second one of the configurations with the configuration circuitry to cause aging processes in circuitry that is not aged by the first one of the configurations.

In Example 22, the subject matter of Example 21 can optionally further include moving the user design from the second one of the configurations back to the first one of the configurations with the configuration circuitry.

In Example 23, the subject matter of any one of Examples 21-22 can optionally further include moving the user design from the second one of the configurations to a third one of the configurations with the configuration circuitry to cause the aging processes in circuitry that is not aged by the first and second ones of the configurations.

In Example 24, the subject matter of Example 23 can optionally include moving the user design from the third one of the configurations back to the first one of the configurations with the configuration circuitry.

In Example 25, the subject matter of any one of Examples 21-23 can optionally include wherein implementing the user design in the first one of the configurations further comprises configuring first circuit blocks in the programmable integrated circuit with the configuration circuitry to implement the first one of the configurations of the user design, and wherein moving the user design from the first one of the configurations to the second one of the configurations further comprises configuring second circuit blocks in the programmable integrated circuit with the configuration circuitry to implement the second one of the configurations of the user design, wherein at least some of the second circuit blocks are different than the first circuit blocks.

In Example 26, the subject matter of Example 21 can optionally include wherein moving the user design from the first one of the configurations to the second one of the configurations further comprises partially reconfiguring a part of the user design with the configuration circuitry such that a first portion of the second one of the configurations is implemented by the same circuits as a first portion of the first one of the configurations and a second portion of the second one of the configurations is implemented by different circuits than a second portion of the first one of the configurations.

In Example 27, the subject matter of Example 21 can optionally include wherein implementing the user design in the first one of the configurations further comprises placing the first one of the configurations in first circuits in a subset of programmable logic circuit blocks in the programmable integrated circuit using the configuration circuitry, and wherein moving the user design from the first one of the configurations to the second one of the configurations further comprises placing the second one of the configurations in second circuits in the subset of the programmable logic circuit blocks using the configuration circuitry, wherein the second circuits are different than the first circuits.

In Example 28, a programmable integrated circuit comprises: configuration circuitry configured to receive configurations of a user design for the programmable integrated circuit, wherein each of the configurations implements the user design using at least some unique circuitry in the programmable integrated circuit relative to the other ones of the configurations, wherein the configuration circuitry is further configured to implement the user design in a first one of the configurations, and wherein the configuration circuitry is further configured to move the user design from the first one of the configurations to a second one of the configurations to cause effects of aging processes in circuits in the programmable integrated circuit that are not aged by the first one of the configurations.

In Example 29, the programmable integrated circuit of Example 28 may include, wherein the configuration circuitry is further configured to move the user design from the second one of the configurations back to the first one of the configurations.

In Example 30, the programmable integrated circuit of Example 28 may include, wherein the configuration circuitry is further configured to move the user design from the second one of the configurations to a third one of the configurations to cause effects of the aging processes in circuits that are not aged by the first and second ones of the configurations.

In Example 31, the programmable integrated circuit of Example 30 may include, wherein the configuration circuitry is further configured to move the user design from the third one of the configurations back to the first one of the configurations.

In Example 32, the programmable integrated circuit of Example 28 may include, wherein the configuration circuitry is further configured to configure first programmable circuit blocks in the programmable integrated circuit to implement the first one of the configurations, and wherein the configuration circuitry is further configured to configure second programmable circuit blocks in the programmable integrated circuit to implement the second one of the configurations, wherein at least some of the second programmable circuit blocks are different than the first programmable circuit blocks.

In Example 33, the programmable integrated circuit of Example 28 may include, wherein the configuration circuitry is further configured to place the first one of the configurations in first circuits in a subset of programmable logic circuit blocks in the programmable integrated circuit, and wherein the configuration circuitry is further configured to place the second one of the configurations in second circuits in the subset of the programmable logic circuit blocks, wherein the second circuits are different than the first circuits.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A computer readable non-transitory medium storing executable instructions for reducing uneven aging in a programmable integrated circuit, the executable instructions comprising:
   instructions executable by a design tool to generate configurations of a user design for the programmable integrated circuit, wherein each of the configurations implements the user design using at least some unique circuitry in the programmable integrated circuit relative to the other ones of the configurations;
   instructions executable by the design tool to direct configuration circuitry in the programmable integrated circuit to implement the user design in a first one of the configurations; and
   instructions executable by the design tool to direct the configuration circuitry to move the user design from the first one of the configurations to a second one of the configurations to cause effects of aging processes in circuits in the programmable integrated circuit that are not aged by the first one of the configurations.

2. The computer readable non-transitory medium of claim 1 further comprising:
   instructions executable by the design tool to direct the configuration circuitry to move the user design from the second one of the configurations back to the first one of the configurations.

3. The computer readable non-transitory medium of claim 1 further comprising:
   instructions executable by the design tool to direct the configuration circuitry to move the user design from the second one of the configurations to a third one of the configurations to cause effects of the aging processes in circuits that are not aged by the first and second ones of the configurations.

4. The computer readable non-transitory medium of claim 3 further comprising:
   instructions executable by the design tool to direct the configuration circuitry to move the user design from the third one of the configurations back to the first one of the configurations.

5. The computer readable non-transitory medium of claim 1, wherein the instructions executable by the design tool to direct the configuration circuitry to implement the user design in the first one of the configurations further comprises instructions executable by the design tool to direct the configuration circuitry to configure first programmable circuit blocks in the programmable integrated circuit to implement the first one of the configurations, and
   wherein the instructions executable by the design tool to direct the configuration wherein the instructions executable by the design tool to direct the configuration circuitry to move the user design from the first one of the configurations to the second one of the configurations further comprises instructions executable by the design tool to direct the configuration circuitry to configure second programmable circuit blocks in the programmable integrated circuit to implement the second one of the configurations, wherein at least some of the second programmable circuit blocks are different than the first programmable circuit blocks.

6. The computer readable non-transitory medium of claim 1, wherein the instructions executable by the design tool to direct the configuration circuitry to implement the user design in the first one of the configurations further comprises instructions executable by the design tool to direct the configuration circuitry to place the first one of the configurations in first circuits in a subset of programmable logic circuit blocks in the programmable integrated circuit, and wherein the instructions executable by the design tool to direct the configuration circuitry to move the user design from the first one of the configurations to the second one of the configurations further comprises instructions executable by the design tool to direct the wherein the instructions executable by the design tool to direct the configuration circuitry to move the user design from the first one of the configurations to the second one of the configurations further comprises instructions executable by the design tool to direct the configuration circuitry to place the second one of the configurations in second circuits in the subset of the programmable logic circuit blocks, wherein the second circuits are different than the first circuits.

7. The computer readable non-transitory medium of claim 1, wherein the instructions executable by the design tool to direct the configuration circuitry to move the user design from the first one of the configurations to the second one of the configurations further comprises instructions executable by the design tool to direct the configuration circuitry to partially reconfigure a part of the user design such that a first portion of the second one of the configurations is implemented by the same circuits as a first portion of the first one of the configurations and a second portion of the second one of the configurations is implemented by different circuits than a second portion of the first one of the configurations.

8. A method for reducing uneven aging in a programmable integrated circuit, the method comprising:

receiving configurations of a user design for the programmable integrated circuit from a design tool, wherein each of the configurations implements the user design with at least some unique circuitry in the programmable integrated circuit relative to the other ones of the configurations;

implementing the user design in a first one of the configurations with configuration circuitry in the programmable integrated circuit; and moving the user design from the first one of the configurations to a second one of the configurations with the configuration circuitry to cause aging processes in circuitry that is not aged by the first one of the configurations.

9. The method of claim 8 further comprising:

moving the user design from the second one of the configurations back to the first one of the configurations with the configuration circuitry.

10. The method of claim 8 further comprising:

moving the user design from the second one of the configurations to a third one of the configurations with the configuration circuitry to cause the aging processes in circuitry that is not aged by the first and second ones of the configurations.

11. The method of claim 10 further comprising:

moving the user design from the third one of the configurations back to the first one of the configurations with the configuration circuitry.

12. The method of claim 8, wherein implementing the user design in the first one of the configurations further comprises configuring first circuit blocks in the programmable integrated circuit with the configuration circuitry to implement the first one of the configurations of the user design, and wherein moving the user design from the first one of the configurations to the second one of the configurations further comprises configuring second circuit blocks in the programmable integrated circuit with the configuration circuitry to implement the second one of the configurations of the user design, wherein at least some of the second circuit blocks are different than the first circuit blocks.

13. The method of claim 8, wherein moving the user design from the first one of the configurations to the second one of the configurations further comprises partially reconfiguring a part of the user design with the configuration circuitry such that a first portion of the second one of the configurations is implemented by the same circuits as a first portion of the first one of the configurations and a second portion of the second one of the configurations is implemented by different circuits than a second portion of the first one of the configurations.

14. The method of claim 8, wherein implementing the user design in the first one of the configurations further comprises placing the first one of the configurations in first circuits in a subset of programmable logic circuit blocks in the programmable integrated circuit using the configuration circuitry, and wherein moving the user design from the first one of the configurations to the second one of the configurations further comprises placing the second one of the configurations in second circuits in the subset of the programmable logic circuit blocks using the configuration circuitry, wherein the second circuits are different than the first circuits.

15. A programmable integrated circuit comprising:

configuration circuitry configured to receive configurations of a user design for the programmable integrated circuit, wherein each of the configurations implements the user design using at least some unique circuitry in the programmable integrated circuit relative to the other ones of the configurations, wherein the configuration circuitry is further configured to implement the user design in a first one of the configurations, and wherein the configuration circuitry is further configured to move the user design from the first one of the configurations to a second one of the configurations to cause effects of aging processes in circuits in the programmable integrated circuit that are not aged by the first one of the configurations.

16. The programmable integrated circuit of claim 15, wherein the configuration circuitry is further configured to move the user design from the second one of the configurations back to the first one of the configurations.

17. The programmable integrated circuit of claim 15, wherein the configuration circuitry is further configured to move the user design from the second one of the configurations to a third one of the configurations to cause effects of the aging processes in circuits that are not aged by the first and second ones of the configurations.

18. The programmable integrated circuit of claim 17, wherein the configuration circuitry is further configured to move the user design from the third one of the configurations back to the first one of the configurations.

19. The programmable integrated circuit of claim 15, wherein the configuration circuitry is further configured to configure first programmable circuit blocks in the programmable integrated circuit to implement the first one of the configurations, and wherein the configuration circuitry is further configured to configure second programmable circuit blocks in the programmable integrated circuit to implement the second one of the configurations, wherein at least some of the second programmable circuit blocks are different than the first programmable circuit blocks.

20. The programmable integrated circuit of claim 15, wherein the configuration circuitry is further configured to place the first one of the configurations in first circuits in a subset of programmable logic circuit blocks in the programmable integrated circuit, and wherein the configuration circuitry is further configured to place the second one of the configurations in second circuits in the subset of the programmable logic circuit blocks, wherein the second circuits are different than the first circuits.

* * * * *